United States Patent [19]

Fujita et al.

[11] Patent Number: 4,816,332
[45] Date of Patent: Mar. 28, 1989

[54] POROUS MOLDED PRODUCT AND PROCESS FOR PREPARING THE SAME

[75] Inventors: Naoshi Fujita, Anjyo; Motoaki Oe, Inazawa; Hitoshi Yoshida, Okazaki; Yukihisa Takeuchi, Chita, all of Japan; Naoki Ueda, Obu, all of Japan

[73] Assignees: Inoue Mtp Kabushiki Kaisha; Nippondenso Co., Ltd., both of Aichi, Japan

[21] Appl. No.: 181,541

[22] Filed: Apr. 14, 1988

[30] Foreign Application Priority Data

Apr. 20, 1987 [JP] Japan .................................. 62-97074

[51] Int. Cl.[4] .............................................. B32B 3/26
[52] U.S. Cl. .................................. 428/304.4; 427/244; 427/372.2; 427/393.5; 428/306.6; 428/308.4; 428/311.1; 428/311.5; 428/314.2
[58] Field of Search ................... 427/244, 372.2, 393.5; 428/304.4, 306.6, 308.4, 311.1, 311.5, 314.2

[56] References Cited

U.S. PATENT DOCUMENTS 2,354,430  7/1944  Greenup et al. ................. 428/308.4
3,978,266  8/1976  Lock ................................ 428/314.2

Primary Examiner—William J. Van Balen
Attorney, Agent, or Firm—Koda & Androlia

[57] ABSTRACT

Disclosed are a porous molded product comprising a foam having a three-dimensional cell-membrane-free network skeletal structure, which has been extended to make long the shape of the mesh pores thereof in a given direction, and having deposited onto the skeleton thereof a cured resin without clogging the mesh pores and a process for preparing said porous molded product. The porous molded product according to this invention can be used as a filter material or used when a porous ceramic structural body is sinter molded.

6 Claims, 2 Drawing Sheets

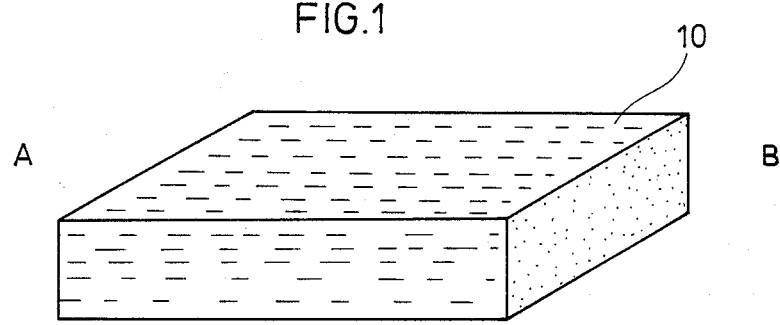
FIG.1
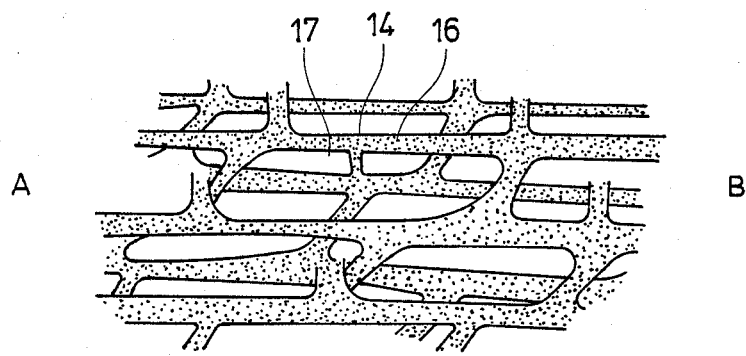
FIG.2
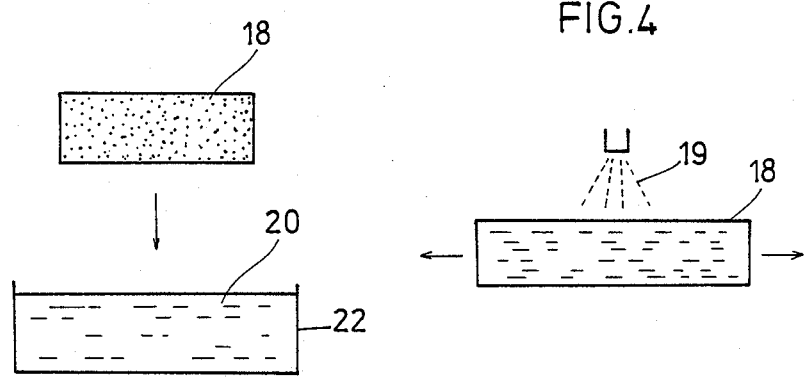
FIG.3
FIG.4

POROUS MOLDED PRODUCT AND PROCESS FOR PREPARING THE SAME

FIELD OF THE INVENTION

This invention relates to a porous molded product used as a filter material or used when a porous ceramic structural body is sinter molded, and a process for preparing the same.

BACKGROUND OF THE INVENTION

Of foams comprising three-dimensional network skeletal structure, porous molded products comprising urethane foams or the like mainly composed of open cells or from which cell membranes have been removed have spaces communicating through the inside and outside, formed by the open cells or cell-membrane-free network skeleton. Accordingly, in such porous molded products, fluids such as air and liquid can pass through said communicative spaces and on the other hand any particles larger than the cells or the mesh pores (open spaces in the network) can not pass through these cells or mesh pores and captured at the cell or mesh part. They therefore are widely used in air filters, liquid-filtering mediums, etc. Such porous molded product is also used for the purpose of depositing a ceramic to the skeleton of the porous molded product so that the ceramic may retain in a predetermined shape when the porous ceramic structural bodies to be used as catalysts or the like are sinter molded.

Incidentally, since the porous molded products have a structure that substantially spherical cells (pores) communicating to one another or a structure that membranes of the cells have been removed, the breathing resistance can be reduced by reducing the number of cells (cell number per inch), whereby pressure loss can be minimized and flow velocity of fluids can be increased.

However, by reducing the cell number of the porous molded product, the size of the open cells or the mesh pores of the skeleton becomes larger to cause the following problems.

A first problem is that minute particles can not be filtered if such porous molded product is used as a filtering medium. A second problem is that if such porous molded product is used as a starting material for a ceramics carrier, the mesh size of porous ceramic structural body to be obtained becomes larger, and therefore, in instances where such porous ceramic structural body is used as catalysts, the contact area between the fluid (gases, etc.) flowing through the inside of said ceramic structural body and the ceramic becomes smaller to reduce its catalytic action.

For this reason, in conventional cases, there has been a limit in making cell size smaller, and it has been impossible to obtain porous molded products having small pressure loss.

OBJECT OF THE INVENTION

An object of this invention is to provide a novel porous molded product that can effectively settle the problem involved in the conventional porous molded products, i.e., the difficulty in reducing pressure loss, and a process for preparing the same.

SUMMARY OF THE INVENTION

A first invention is summarized by a porous molded product comprising a foam having a three-dimensional cell-membrane-free network skeletal structure, which has been extended to make long the shape of mesh pores thereof in a given direction, and a cured resin deposited onto the skeleton of said foam without clogging the mesh.

A second invention is summarized by a process for preparing a porous molded product, comprising dipping a foam having a three-dimensional cell-membrane-free network skeletal structure in a liquid reaction-curable resin to allow a reaction-curable resin to be deposited onto the skeleton of said foam, followed by extension of the resulting foam in a given direction without squashing the openings of the mesh thereof, and then curing of the reaction-curable resin in that state.

The three-dimensional cell-membrane-free network skeletal structure foam (hereinafter called "cell-membrane-free foam") is composed only of the skeleton of network form, and thus is suitably used as a filter medium or a starting material for a ceramics carrier.

The present inventors made various studies on such a cell-membrane-free foam to reduce pressure loss thereof.

As a result, they found that the shape of the mesh pores thereof greatly affect the pressure loss.

The cell-membrane-free foam is formed by controlling the formulation of the materials for constituting the foam or by applying to an ordinary foam a post-treatment such as alkali treatment or explosion to be free from cell membrane, and it is composed originally of substantially oval mesh skeleton units A combined into a network form as shown in FIG. 6.

However, when the cell-membrane-free foam was extended to make long the shape of the meshes in a given direction, there was obtained an effect that the pressure loss thereof can be greatly reduced and yet it is stable.

However, a cell-membrane-free foam must be extended in order to obtain an elongated mesh shape, it is necessary for said foam to be constituted of a soft foam or the like having relatively high extensibility. Nonetheless, if the extending force (pulling force) applied to the soft foam or the like is removed, the mesh pores thereof return to the original state, i.e., the state of substantially oval shape, due to its elastic restoring force. Thus the shape of the mesh pores can not be fixed as elongated.

For this reason, it may be contemplated that the shape of the mesh pores is fixed as elongated by utilizing the heat deformation property of the soft foam or the like, namely the property that the soft foam or the like can take a given shape when it is maintained in said shape at a high temperature.

However, a relatively high rigidity is required depending on the use of the porous molded product. Therefore, those formed by heat deformation of the above soft foam or the like may have insufficient rigidity, disadvantageously.

Accordingly, as in the first invention, the porous molded product was constituted by making long the shape of mesh pores of the cell-membrane-free foam in a given direction and allowing a cured resin to be deposited onto the skeleton of said foam without clogging up the mesh pores. In the resulting porous molded product, the shape of the mesh pores is fixed as elongated by virtue of the rigidity of the cured resin deposited onto the skeleton, and also the rigidity is increased as a whole. Moreover, it comprises three-dimensional cell-membrane-free network skeletal structure, and also the mesh pores thereof each have a shape elongated in a given direction, thus exhibiting a stable and very low pressure loss.

The second invention, on the other hand, is a process for preparing the novel porous molded product constitute as described above, and the product is prepared in the following manner:

First, a cell-membrane-free foam is dipped in a liquid reaction-curable resin to allow the reaction-curable resin to penetrate into the interstices of the skeleton of the foam. The liquid reaction-curable resin is deposited on the skeleton surface in the form of a layer by virtue of its viscosity or the like.

Next, said cell-membrane-free foam is extended in a given direction in the manner that the mesh pores may not be squashed. Thereby the shape of the mesh pores of the foam is made long in a given direction.

Then, in the thus extended state, the reaction-curable resin deposited on the skeleton of the cell-membrane-free foam is reaction cured to form a cured resin. The rigidity of the thus cured resin retains the cell-membrane-free foam in the above extended state, i.e., the shape of the mesh pores is fixed as elongated, and at the same time the rigidity of the entire foam can be increased, thus forming the novel porous molded product of the first invention.

Since the porous molded product according to this invention comprises the cell-membrane-free foam which has been extended to make long the shape of mesh pores in a given direction, it has achieved a considerable reduction in the pressure loss. Moreover, it comprises the cured resin deposited onto the skeleton of the foam, whereby the shape of mesh pores can be fixed as elongated, to achieve a stable pressure loss, as well as, to enhance its rigidity. Also, even if the mesh pores become larger (longer) in one direction owing to the extension of the foam, they become smaller (shorter) in the direction orthogonal thereto, and thus it may not occur that it fails to filter off minute particles. On the other hand, also when it is used as a ceramics carrier, the intersticial distance between the ceramic skeleton of the resulting porous ceramic structural body becomes small, since the density of the mesh becomes smaller in one direction. Thus the catalytic action of the structural body may not be reduced when it is used as a catalyst.

The process for preparing the porous molded product according to this invention also enabled to readily obtain porous molded products that exhibit very low and stable pressure loss.

BRIEF DESCRIPTION OF THE DRAWINGS

FIG. 1 is a perspective view of an embodiment of the porous molded product according to this invention;

FIG. 2 is a partially enlarged view of FIG. 1;

FIG. 3 and FIG. 4 are views illustrative of the preparation steps in the preparation process of this invention;

DETAILED DESCRIPTION OF THE INVENTION

Figure 5:
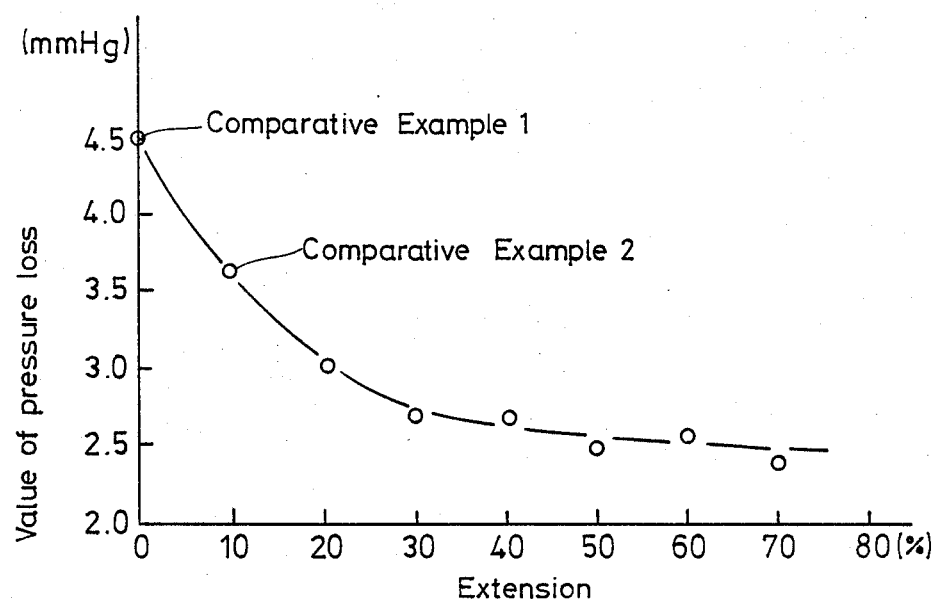
FIG. 5 is a graph showing pressure loss of the porous molded product of this invention.
Figure 6:
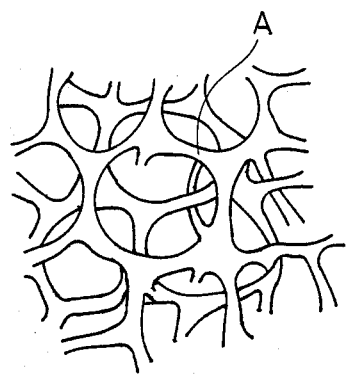
FIG. 6 is a partially enlarged view of a foam comprising a three-dimensional cell-membrane-free network skeletal structure.

This invention wil be illustrated below by way of embodiments.

FIG. 1 is a perspective view of an exemplary porous molded product 10 obtained according to this invention, and FIG. 2 is a partially enlarged view of the porous molded product 10.

The porous molded product 10 is formed by extending a cell-membrane-free foam to make long the shape of the mesh pores 17 of the cell-membrane-free foam in a given direction (A-B direction) and allowing a cured resin 16 to be deposited onto the skeleton 14 of said foam without clogging up the mesh pores 17.

The cell-membrane-free foam may preferably includes soft urethane foams as the cell size, hardness, etc. can be readily controlled. Among them, preferred are polyester type soft urethane foams on the ground that the cell size can be made constant with ease and the like. The cell size of thi foam depends on the density of the foam, uses of the porous molded product 10 etc. For example, when the porous molded product is used as a starting material for ceramic carriers, assuming that the cell-membrane-free foam comprises a polyester soft urethane foam having a density of 30 kg/m$^3$, suitable cell size may usually range from 4 to 20 ppi (the number of cell per inch). The cell-membrane-free foam can be readily obtained according to a conventional means such as mixing treatment, alkali treatment and explosin treatment.

It is hard to say that the optimal shape of the mesh pore 17 is always constant as it may vary depending on the thickness of the skeleton 14 of the cell-membrane-free foam, cell size, etc., but preferred is an elongated shape resulting from the state that the foam has been stretched out (i.e., extended) in a given direction by 20 to 120%, particularly 20 to 70%, longer than its original size. In the above extension by 20 to 120%, an average value of the long diameter/short diameter ratio of the mesh pore 17 will be usually 1.2 or more.

The cured resin 16 is deposited onto the skeleton 14 in the form of a thin layer. The thermo-plastic resin such as polyvinyl chloride resin, ABS resin, polyethylene resin or polypropylene resin can be used as the cured resin 16 by selecting a depositing condition. But it is preferred in view of better workability and of better product property that the reaction-curable resins which are thermo-set resin such as saturated or unsaturated polyester resin, polyurethane resin, phenol resin or urea resin which is thermo-setting, the photo-curable resin such as saturated or unsaturated polyester resin, polyester-urethane resin or acrylic resin which is photo-curable and the moisture-curable resin such as moisture-curable polyurethane resin, are selected. And the most preferable are moisture-curable polyurethane resins exemplified by isocyanate-terminated polyurethane prepolymers, polymeric MDI and liquid MDI.

An example of the process for preparing the above porous molded product 10 will be described below. FIG. 3 and FIG. 4 are views illustrative of the preparation steps thereof.

First, a cell-membrane-free foam 18 having a predetermined cell size, density, etc. is molded. The materials for this cell-membrane-free foam 18, cell size, density, molding means are the same as those described above.

This cell-membrane-free foam 18 is dipped in a tank 22 of a liquid reaction-curable resin 20 as shown in FIG. 3. This allows the reaction-curable resin 20 to penetrate into the cell-membrane-free foam 18 and deposit onto the skeleton of said foam 18. Thereafter, the cell-membrane-free foam 18 is taken out of the tank 22, and the excess reaction-curable resin retained in the interstices of the skeleton of the foam 18 is removed by allowing it to naturally flow down from the foam 18. Thereby the reaction-curable resin remains deposited onto the skeleton, only in the form of a thin film in the cell-membrane-free foam 18, and, as a result, said reaction-curable resin can be prevented from forming a membrane to clog the interstices of the skeletoh, i.e., the mesh pores.

Particularly preferred as the liquid reaction-curable resin 20 are the moisture-curable resin as exemplified by isocyanate-terminated urethane prepolymers or polymeric MDI, in view of workability and so forth. This urethane prepolymer or polymeric MDI has a nature to be cured upon reaction by moisture in air or steam or the like, exhibiting high workability.

Subsequently, the cell-membrane-free foam 18 is extended in a given direction as shown in FIG. 4 without squashing the mesh pores thereof (closing) to elongate the mesh pores. The degree of extension may vary depending on the cell size of the foam 18, density, material, uses of the porous molded product, etc., but may preferably be in the range of approximately from 20 to 120%, particularly from 20 to 70%. The extension may effectively be made in a direction which is the same as in the blowing when the cell-membrane-free foam 18 is molded, but is by no means limited thereto, and may be in the direction orthogonal to the blowing direction. An optimal direction may be determined depending on the workability, the shapes of products, the uses, etc.

Then, in that extended state, the reaction-curable resin deposited onto the skeleton of the cell-membrane-free foam 18 is cured. The curing means may vary depending on the reaction-curable resin to be used. When, for example, the above moisture-curable urethane prepolymer is used, the curing is carried out by spraying steam 19 on said foam 18. By this steam treatment the urethane prepolymer can be cured in a short time, since the reaction of the urethane prepolymer is initiated by its moisture, and moreover its heat accelerates the reaction.

The curing of the above reaction-curable resin results in deposition of the resin having been cured (or cured resin) to the skeleton of the cell-membrane-free foam 18. As a result, because of the rigidity of the cured resin, the shape of the cell-membrane-free foam 18 is fixed in the extended state, the shape of the mesh pore is fixed as elongated in a given direction, and at the same time the rigidity of the entire foam 18 is enhanced, to provide the desired porous molded product 10 shown in FIG. 1.

Next, to confirm the effect of this invention a plurality of porous molded products according to this invention were prepared in the same manner as described in the above preparation process, using, as the cell-membrane-free foam, a block of 200×200×300 mm comprised of a polyester type soft urethane foam having a density of 30 kg/m$^3$ and a cell size of 10 ppi, and as the liquid reaction-curable resin, a mixed solution comprised of 10 parts by weight of diphenylmethane diisocyanate type isocyanate-terminated urethane prepolymer (NCO content: 28.0 to 30.0%) and 50 parts by weight of a solvent (1,1,1-trichloromonofluoroethane), wherein the extension direction was in the blowing direction of the cell-membrane-free foam, the degree of extension being 20 to 70%, and the curing of the reaction-curable resin was effected by spraying steam for 3 minutes. The resulting porous molded products were elastically deformable, but had two-fold compression strength or more as compared with the same cell-membrane-free foams in an untreated state. Prepared from these porous molded products were a plurality of test pieces of 100 mm in diameter and 60 mm in length, having the above extension direction as the lengthwise direction, to measure pressure loss at an air flow of 3.0 m$^2$/min according to JIS D-1612. Results obtained are shown in FIG. 5. For comparison, prepared were a product (Comparative Example 1) having the same dimension, using the same cell-membrane-free foam having substantially oval mesh pores, to which no treatment had been applied, and a product (Comparative Example 2) having same dimension and an extended by 10%, to measure pressure loss in the same manner.

As a result, the pressure loss in Comparative Example 1 was found to be 4.5 mmHg, while the pressure loss for the test pieces of the porous molded products according to this invention showed values as low as 2.3 to 3.1 mmHg at extension degrees of 20 to 70%.

What is claimed is:

1. A porous molded product comprising a foam having a three-dimensional cell-membrane-free network skeletal structure, which has been extended to make long the shape of the mesh pores thereof in a given direction, and having deposited onto the skeleton thereof a cured resin without clogging the mesh pores.

2. The porous molded product according to claim 1, wherein the foam having a three-dimensional network skeletal structure comprises a soft urethane foam.

3. The porous molded product according to claim 2, wherein the cured resin comprises a reaction-curable resin.

4. A process for preparing a porous molded product, comprising dipping a foam having a three-dimensional cell-membrane-free network skeletal structure in a liquid reaction-curable resin to allow the reaction-curable resin to be deposited onto the skeleton of said foam, followed by extension of the resulting foam in a given direction without squashing the mesh pores thereof, and then curing the reaction-curable resin in that state.

5. The process for preparing a porous molded product according to claim 4, wherein the foam having a three-dimensional network skeletal structure comprises a soft urethane foam.

6. The process for preparing a porous molded product according to claim 4 or 5, wherein the reaction-curable resin comprises a moisture-curable resin.

* * * * *